United States Patent [19]
Riley

[11] 3,794,058

[45] Feb. 26, 1974

[54] PNEUMATIC AMPLIFIERS

[76] Inventor: John Terence Riley, Bank St., Walshaw, Bury, England

[22] Filed: Feb. 9, 1972

[21] Appl. No.: 224,838

[30] Foreign Application Priority Data
Feb. 11, 1971 Great Britain...................... 4439/71
Feb. 11, 1971 Great Britain...................... 4440/71

[52] U.S. Cl..................................... 137/82, 251/28
[51] Int. Cl.............................................. G05d 16/06
[58] Field of Search............137/82, 625.33, 625.61, 137/625.66; 251/367

[56] References Cited
UNITED STATES PATENTS
765,925   7/1904   Ibach et al................. 137/625.33 X
FOREIGN PATENTS OR APPLICATIONS
1,027,402   4/1966   Great Britain........................ 137/82

*Primary Examiner*—Arnold Rosenthal
*Attorney, Agent, or Firm*—Browne, Beveridge, DeGrandi & Kline

[57] ABSTRACT

There is described a pneumatic amplifier comprising a housing, a diaphragm dividing the housing into first and second chambers, an inlet port to the first chamber for receiving an input signal, an exhaust port from the second chamber, a manifold in the second chamber, an inlet port to the manifold for a supply of pressure air, and an outlet from the manifold for an amplified output signal, the manifold having at least one axially offset orifice confronting the diaphragm. The amplified output signal is used to control the position of a movable member, for example a valve member. A feed-back connection may be provided between the movable member and the amplifier and a setting device may control the input signal.

9 Claims, 7 Drawing Figures

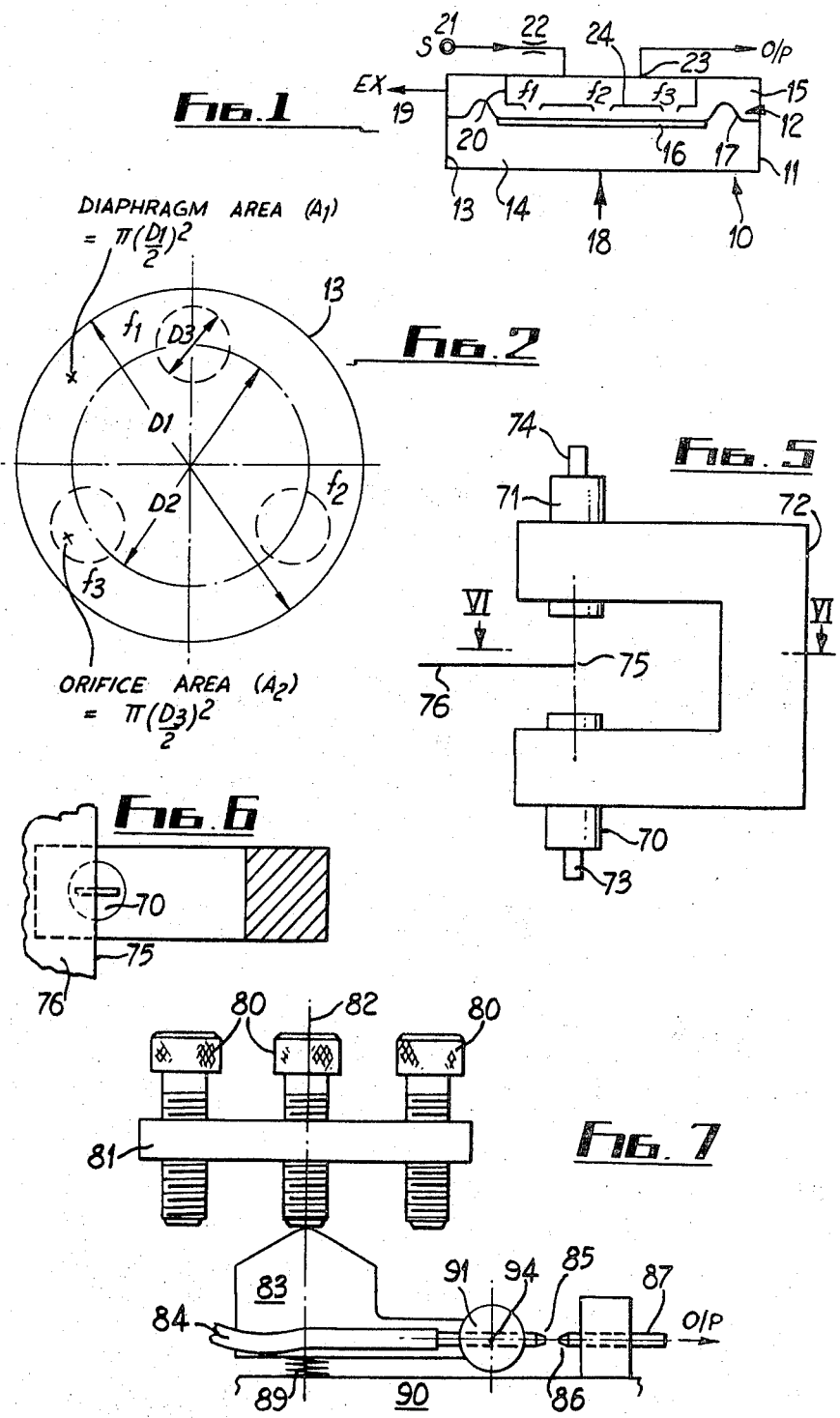

PNEUMATIC AMPLIFIERS

This invention relates to pneumatic amplifiers and to apparatus incorporating pneumatic amplifiers for controlling the position of movable members.

According to the invention a pneumatic amplifier comprises a housing, a diaphragm dividing the housing into first and second chambers, an inlet port to the first chamber for receiving an input signal, an exhaust port from the second chamber, a manifold in the second chamber, an inlet port to the manifold for a supply of pressure air, and an outlet from the manifold for an amplified output signal, the manifold having at least one axially offset orifice confronting the diaphragm.

The amplifier output signal may be used to control the position of a movable member, for example a valve member, and there may be a feedback connection between the movable member and the amplifier; for example the feedback connection may be a spring acting between the movable member and the diaphragm.

There may be a manually adjustable setting device to control the input signal to the amplifier so that for example if the valve controls the movement of a machine tool slide, the slide speed may be adjusted by adjusting the setting device.

The invention may be performed in various ways and some specific embodiments will now be described by way of example with reference to the accompanying drawings, in which:

FIG. 1 is a schematic section through a pneumatic amplifier;

FIG. 2 is an end view of FIG. 1;

FIG. 5 is an elevation of a web sensing device;

FIG. 6 is a section on the line VI—VI of FIG. 5; and

FIG. 7 shows part of another arrangement.

Figure 3:
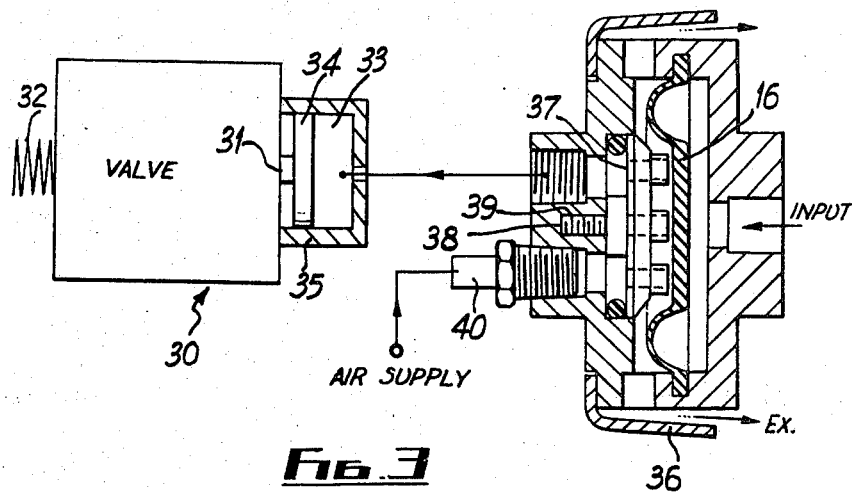
FIG. 3 is an elevation, part in axial section, of an arrangement for controlling a valve.

Referring generally to the drawings, in control systems it is often necessary to control a movable member, such as the valve member of a valve, in response to low pressure air signals (approx. 4 inches $H_2O$). Normally, in order to obtain enough force to operate the valve, a large diaphragm is used to respond to the air signal and produce a force which acts on the valve, this has the disadvantage of giving a slow response to input signal variations.

With the present arrangements, by amplifying the air signal before applying it to the valve, the same force can be obtained with a much smaller diaphragm.

The arrangements are basically a proportional pneumatic amplifier in two forms, either with or without feedback.

Referring to FIGS. 1 and 2, a pneumatic amplifier 10 comprises a housing 11, a diaphragm 12 extending across the housing and peripherally secured to a wall 13 of the housing to divide the housing into chambers 14 and 15. The diaphragm comprises a rigid flat circular central portion 16 connected to a flexible annular portion 17 itself connected to wall 13 and of outer effective diameter $D_1$. An input air signal may enter the chamber 14 at 18. Chamber 15 is connected to exhaust at 19. A manifold 20 is disposed in chamber 15 and is connected at 21 to a source of air under pressure through a restrictor 22 and has an aperture at 23 for an output signal.

A flat wall 24 of the manifold opposite the diaphragm portion 16 has three orifices $f_1, f_2, f_3$, through which air under pressure constantly escapes to impinge on the diaphragm. The orifices are equally angularly spaced on a circle of diameter $D_2$ (FIG. 2) and are of equal diameter $D_3$.

The low pressure input signal at 18 causes the diaphragm to move closer to orifices $f_1, f_2, f_3$ until the pressure built up in the manifold produces a force over the areas of the orifices to balance the force on the diaphragm due to the input signal.

At balance:

$$P_1 A_1 = 3 P_2 A_2 \quad \text{(See FIG. 2)}$$

Where $P_1$ is the low pressure input signal to the amplifier $P_2$ is the output pressure at port 23 and $A_2$ is the area of a single orifice.

Amplification $\quad P_2/P_1 = A_1/3A_2$

Three orifices are used, instead of a single central one, to increase the diameter over which the balancing force acts. This increase in diameter causes the diaphragm to sit squarely at right angles to the axes of the orifices (the diaphragm does not actually touch the orifices) hence producing good consistency of amplification. If a single central orifice of three times the area were used the diaphragm would not always be positioned squarely, and would tend to engage the orifice, hence giving an inferior and inconsistent performance.

The output signal of the amplifier is proportional to the input signal.

The diaphragm remains clear of the orifices and manifold throughout the working range of the amplifier.

The air pressure delivered by the source to the manifold may be 5 psi. for example.

In an alternative arrangement the manifold has only one axially offset orifice, e.g., $f_1$, the orifices $f_2, f_3$ being replaced by closed projections extending from the main plane of the manifold wall 24 the same distance as the mouth of orifice $f_1$. In this case the diaphragm will engage the closed projections, and become slightly tilted, throughout the working range of the amplifier. However the output signal remains proportional to the input signal, although the amplification formula given above does not apply.

There could be more than three offset orifices with or without closed projections.

Referring now to FIG. 3, the amplifier is arranged to control the movement of a spool 31 in a proportional valve 30, that is the valve is progressively opened or closed by movement of the spool. The spool 31 is biased in one sense by a spring 32 and in the other sense by air pressure in chamber 33 engaging a piston 34 in housing 35, the piston being connected to the spool. The amplifier has an annular dust cover 36 and an end wall 37 of the manifold engages an annular O-ring and a screw 38 engages in a threaded central bore 39 in a wall of the amplifier housing to mount the manifold. Air is supplied through an adaptor plug 40 which incorporates a restrictor. The output signal acts on the piston 34. The position of the valve spool may control the flow of oil to a machine tool slide so that the speed of the slide may be controlled by the position of the spool.

Figure 4:
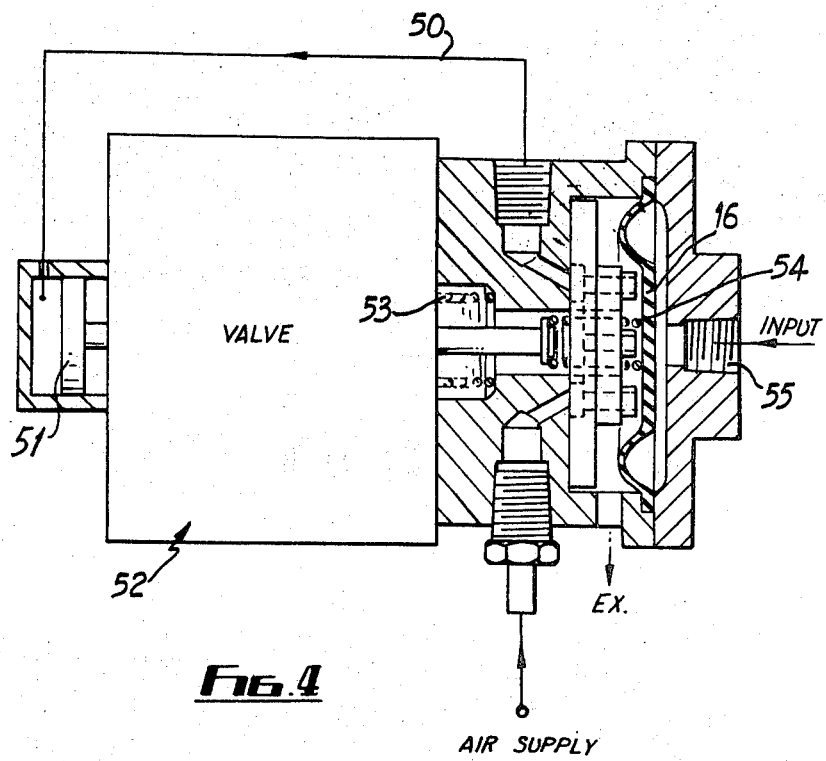
FIG. 4 is similar to FIG. 3 but shows a modified arrangement.

In the arrangement of FIG. 4, unlike that of FIG. 3, a feedback connection is provided. The output signal in line 50 acts on piston 51 connected to the spool of valve 52 and causing the spool to move against the action of a strong helical spring 53 which at one end abuts the amplifier housing. The feedback connection comprises a helical spring 54, between an extension of the spool and the diaphragm and extending through a central passage in the manifold, so that the spool position varies in relation to the input signal pressure at port 55. The manifold is held against the housing wall, with an intermediate paper seal, by suitable screws.

In both these cases the flow passages controlled by the valve spool are not shown.

The proportional fluid valve which the amplifier controls can be either pneumatic or hydraulic.

In FIG. 4 the feedback gives higher spool positioning accuracy, overcoming or reducing the effect of spool friction and forces due to fluid flow.

FIGS. 5 and 6 show an arrangement for sensing the position of the edge of a web.

The sensor comprises an emitter nozzle 70 and a receiver nozzle 71 held in accurate alignment by a body 72. The nozzles 70 and 71 may be slidable in the body 72 so as to be axially adjustable, or they may be threaded therein.

An emitter input port 73 is supplied from a source with air under pressure and produces a jet of air between the nozzles 70 and 71. The output port 74 of the receiver nozzle 71 is connected to the inlet port of the analogue pneumatic amplifier 10.

The diaphragm produces a force in relation to the position of a web between the nozzles and hence the pressure received at the inlet of nozzle 71.

The pressure received at the inlet of the nozzle 71 is an analogue of the position of the edge 75 of the web 76.

The nozzles 70, 71 are in the form of slits, preferably but not necessarily of the same dimensions, are preferably coplanar but could be at an angle to one another to vary the relationship between the pressure received at nozzle 71 with the length of nozzles 70 and 71. Thus the nozzles could be of equal length with the receiver nozzle slightly wider than the other nozzle.

The output signal at 74 is arranged to be the input signal for the pneumatic amplifier.

When the edge of the web or sheet is at the desired central position as shown in FIG. 5, the output signal at 74 has a value ascertained by testing. In use, if the web position deviates from central, the output pressure at the outlet of the amplifier will change also in accordance with the characteristics of the system and this change can be used to operate mechanism, such as a free piston, to move the web edge back to the central position if required. If the web moves to the left in FIG. 5 the output pressure increases, and if the web moves to the right, the output pressure decreases.

FIG. 7 shows part of an arrangement for selecting several preset signals. This system is basically intended for speed control on machine tools where more than one adjustable speed is required for a particular machine slide. An example is on capstan lathes where a speed is selected for each station of the turret. In this case the valve would be a variable restrictor.

Setting screws 80 are fitted to a disc 81 which is rotatable about an axis 82 to select a number of predetermined settings by positioning the appropriate screw in line with cam 83.

Air from a suitable source (e.g., 5 psi) is supplied through hose 84 to outlet nozzle 85 having a circular orifice opposed to a circular orifice in aligned receiving nozzle 86.

The low pressure sensor output signal at 87 (approx. 10 inches water max) is fed into an amplifier as described above, this signal causing an amplified signal to appear at port 23.

The speed setting screws 80 contact the suitably shaped cam member 83, depressing the member against the action of a spring 89 connected to a fixed part 90. A moving member 91 is pivoted at axis 94 and carries the air nozzle 85.

When the speed control screw 80 is screwed fully upwards in the Figure, to the position shown, the air nozzle 85 is in line with the receiver nozzle 86 and a maximum output pressure is obtained at the receiver nozzle port 87.

If the speed screw is screwed in towards the member 83, the moving member 91 is pivoted and the nozzles gradually move out of line, thus producing a falling output pressure. Over almost all the range of adjustment the relationship between screw position and output pressure is linear so that the output signal is an analogue of the position of the screw.

I claim:

1. A pneumatic amplifier comprising a housing, a diaphragm having an axis and dividing the housing into first and second chambers, an inlet port to the first chamber for receiving an input signal, an exhaust port from the second chamber, a manifold in the second chamber having a wall confronting said diaphragm, an inlet port to the manifold for a supply of pressure air, and an outlet from the manifold for an amplified output signal, the manifold having a plurality of spaced axially offset orifices confronting the diaphragm.

2. A pneumatic amplifier as claimed in claim 1, comprising at least three orifices equally angularly spaced around the axis of the diaphragm and equally spaced therefrom.

3. A pneumatic amplifier as claimed in claim 1 comprising three orifices of equal area equally angularly spaced around the axis of the amplifier and equally spaced therefrom.

4. A pneumatic amplifier as claimed in claim 2, in which each orifice is circular and the centres of the orifices lie on a common circle.

5. A pneumatic amplifier as defined in claim 1 wherein said manifold has three spaced, axially offset, orifices of equal area confronting said diaphragm.

6. A pneumatic amplifier as defined in claim 1 wherein said manifold has three spaced, axially offset, circular orifices contronting said diaphragm.

7. A pneumatic amplifier as defined in claim 1 wherein said orifices are defined by projections of substantially equal length extending from said manifold wall toward said diaphragm.

8. A pneumatic amplifier comprising a housing, a diaphragm having an axis and dividing the housing into first and second chambers, an inlet port leading into said first chamber for receiving an input signal, an exhaust port leading from said second chamber, a manifold in said second chamber having a wall confronting said diaphragm, an inlet port leading into said manifold for providing a supply of pressure air, and an outlet from said manifold for an amplified output signal, said manifold having at least three orifices confronting said diaphragm, at least two of said orifices being axially offset with respect to said diaphragm and three of said orifices being located on a common circle.

9. A pneumatic amplifier comprising a housing, a diaphragm having an axis and dividing said housing into first and second chambers, an inlet port leading into said first chamber for receiving an input signal, an exhaust port leading from said second chamber, a manifold in said second chamber and having a wall confronting said diaphragm, an inlet port leading into said manifold to admit a supply of pressure air, and an outlet port from said manifold for an amplified output signal, said manifold having at least three projections extending substantially equal distances from said wall toward said diaphragm, at least one of said projections defining an orifice offset from said diaphragm axis, at least three of said projections including said at least one projection being located on a common circle.

* * * * *